(12) United States Patent
Jansen et al.

(10) Patent No.: US 10,361,752 B2
(45) Date of Patent: Jul. 23, 2019

(54) UNIVERSAL VOLTAGE CONVERTER AND INDUCTIVE POWER COUPLING

(75) Inventors: Gerardus Lucien Mathildus Jansen, De Rips (NL); Funda Sahin Nomaler, Eindhoven (NL); Can Nemlioglu, Eindhoven (NL); Ronald Hans Van Der Voort, Helmond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 476 days.

(21) Appl. No.: 14/236,466

(22) PCT Filed: Aug. 7, 2012

(86) PCT No.: PCT/IB2012/054021
§ 371 (c)(1),
(2), (4) Date: Jun. 13, 2014

(87) PCT Pub. No.: WO2013/024401
PCT Pub. Date: Feb. 21, 2013

(65) Prior Publication Data
US 2014/0306546 A1 Oct. 16, 2014

Related U.S. Application Data (60) Provisional application No. 61/540,713, filed on Sep. 29, 2011, provisional application No. 61/522,719, filed on Aug. 12, 2011.

(51) Int. Cl.
*H02J 50/12* (2016.01)
*H04B 5/00* (2006.01)
(Continued)

(52) U.S. Cl.
CPC ............ *H04B 5/0037* (2013.01); *H02J 5/005* (2013.01); *H02J 50/12* (2016.02); *H02J 50/70* (2016.02);
(Continued)

(58) Field of Classification Search
CPC .............. H04B 5/00; H02M 5/04; H02M 7/44
(Continued)

(56) References Cited

U.S. PATENT DOCUMENTS 4,038,625 A   7/1977  Tompkins et al.
4,777,466 A   10/1988 Bordalen
(Continued)

FOREIGN PATENT DOCUMENTS

CN   1700838 A    11/2005
CN   101249801 A   8/2008
(Continued)

*Primary Examiner* — Daniel Kessie
*Assistant Examiner* — Swarna N Chowdhuri (57) ABSTRACT

The present invention relates to a Voltage converter (100) for converting an input voltage (V10) to an output voltage (V20) comprising an input circuitry (102) for receiving the input voltage (V10) from a power supply (112), wherein the input circuitry includes chopper means (110) for chopping a voltage (V12) derived from the input voltage (V10) at a chopper frequency to a chopped voltage (V14), an inductive transformer unit (106) for transforming the chopped voltage (V14) to a chopped AC voltage (V16), and an output circuitry (104) for converting the chopped AC voltage (V16) of the inductive transformer unit (106) to the output voltage (V20) having a lower frequency than the chopper frequency.

14 Claims, 10 Drawing Sheets

(51) Int. Cl.

| | |
|---|---|
| *H02J 50/70* | (2016.01) |
| *H02J 50/90* | (2016.01) |
| *H02J 50/80* | (2016.01) |
| *H02M 5/45* | (2006.01) |
| *H02J 5/00* | (2016.01) |
| *H02M 7/48* | (2007.01) |
| *H05B 33/08* | (2006.01) |
| *H05B 41/24* | (2006.01) |
| *H02M 3/24* | (2006.01) |
| *H02M 5/04* | (2006.01) |
| *H02M 5/42* | (2006.01) |
| *H02M 7/44* | (2006.01) |
| *H02J 11/00* | (2006.01) |
| *H02M 1/00* | (2006.01) |

(52) U.S. Cl.
CPC .............. *H02J 50/80* (2016.02); *H02J 50/90* (2016.02); *H02M 3/24* (2013.01); *H02M 5/04* (2013.01); *H02M 5/42* (2013.01); *H02M 5/45* (2013.01); *H02M 7/44* (2013.01); *H02M 7/4807* (2013.01); *H05B 33/0815* (2013.01); *H05B 41/24* (2013.01); *H02J 11/00* (2013.01); *H02M 2001/007* (2013.01)

(58) Field of Classification Search
USPC .......................................................... 307/104
See application file for complete search history.

(56) References Cited

U.S. PATENT DOCUMENTS

| | | | |
|---|---|---|---|
| 5,408,209 A | 4/1995 | Tanzer et al. | |
| 5,909,100 A | 6/1999 | Watananr et al. | |
| 6,291,947 B1 * | 9/2001 | Koeppl | H05B 41/2985 315/224 |
| 6,445,270 B1 | 9/2002 | Ogasawara | |
| 6,765,808 B1 * | 7/2004 | Jin | H02M 3/33523 363/131 |
| 2005/0258783 A1 | 11/2005 | Honbo | |
| 2007/0008745 A1 | 1/2007 | Joshi et al. | |
| 2007/0141887 A1 | 6/2007 | Kuo et al. | |
| 2008/0055941 A1 * | 3/2008 | Victor | H02M 3/158 363/17 |
| 2010/0014325 A1 * | 1/2010 | Raju | H02M 5/271 363/37 |
| 2010/0080259 A1 * | 4/2010 | Lovens | H05B 6/104 373/152 |
| 2010/0084918 A1 * | 4/2010 | Fells | H02J 5/005 307/32 |
| 2010/0207771 A1 * | 8/2010 | Trigiani | B60L 11/1816 340/636.1 |
| 2011/0068722 A1 * | 3/2011 | Wolf | H02P 21/06 318/400.02 |
| 2011/0155539 A1 * | 6/2011 | Schmidt | B65G 13/06 198/608 |
| 2013/0009484 A1 * | 1/2013 | Yu | H02M 1/4208 307/77 |
| 2013/0062960 A1 * | 3/2013 | Rofe | H02J 5/005 307/104 |

FOREIGN PATENT DOCUMENTS

| | | |
|---|---|---|
| CN | 201167242 Y | 12/2008 |
| CN | 101447760 A | 6/2009 |
| CN | 101698265 A | 4/2010 |
| CN | 101976952 A | 2/2011 |
| EP | 2091129 A2 | 8/2009 |
| GB | 1366134 | 9/1974 |
| JP | 2002084686 A | 3/2002 |

* cited by examiner

UNIVERSAL VOLTAGE CONVERTER AND INDUCTIVE POWER COUPLING

CROSS-REFERENCE TO PRIOR APPLICATIONS

This application is the U.S. National Phase application under 35 U.S.C. § 371 of International Application No. PCT/IB2012/054021, filed on Aug. 7, 2012, which claims the benefit of, U.S. Provisional Patent Application No. 61/540,713, filed on Sep. 29, 2011, and U.S. Provisional Patent Application No. 61/522,719, filed on Aug. 12, 2011. These applications are hereby incorporated by reference herein.

FIELD OF THE INVENTION

The present invention relates to a voltage converter for converting an input voltage to an output voltage and an inductive power coupling for the inductive transfer of electric power.

BACKGROUND OF THE INVENTION

Numerous 50/60 Hz line transformers and switch mode transformers operating in the kHz range are state of the art. However, the conventional transformers operating at the AC line frequency of 50/60 Hz are necessarily bigger than those transformers operating at higher frequencies due to the physical nature of inductive coupling. Switch mode transformers operate at higher frequencies in the kHz range and provide the same power output having a small form factor. None of the conventional voltage transformers provide AC and DC line operation compatibility with a simple control circuitry. Hence, there is a need for improved transformers having a small size and which are compatible to different input voltages.

Further, numerous power couplings are known having direct metallic contact between the mating parts of the plug or power coupling. However, numerous problems exist with such coupling arrangements. In harsh environments, it is difficult to make a robust power connection where a reliable high volume of power can be transferred between the coupling members. Water, salt, oil or other contaminants provide major contact problems for the exposed-contact type of coupling. Watertight sealing is often difficult or even impossible in such situations. In addition, a liquid environment would prevent the coupling from being opened or closed, due to the risk of contamination, power leakage or a short-circuit.

Inductive coupling systems have been developed to transfer power from one coupling member to another coupling member without the need for direct metallic contact between the coupling numbers. However, these systems include numerous flaws and safety concerns that prevent their widespread acceptance.

An inductive power coupling arrangement is proposed to overcome the deficiencies and hazards of the prior art systems.

U.S. Pat. No. 5,909,100 discloses an inductive coupling arrangement having a multiple-magnet array and connectors that may be exposed in required cleaning.

SUMMARY OF THE INVENTION

It is an object of the present invention to provide a voltage converter having a small size, an increased efficiency and which is compatible with AC and DC line operations and different frequencies with low technical effort.

It is a further object of the invention to provide a robust inductive power coupling that eliminates the requirement that an inductive coupling member that is connected to a power source is continuously electrically live.

It is a further object of the invention to provide a robust inductive power coupling that significantly reduces the stray electromagnetic field around the inductive coupling.

It is another object of the invention to provide a robust inductive power coupling that permits the safe transmission of power in wet or harsh environments.

The present invention provides according to a first aspect a voltage converter for converting an input voltage to an output voltage comprising an input circuitry for receiving the input voltage from a power supply, wherein the input circuitry includes chopper means for chopping a voltage derived from the input voltage at a chopper frequency to a chopped voltage, an inductive transformer unit for transforming the chopped voltage to a chopped AC voltage, and an output circuitry for converting the chopped AC voltage of the inductive transformer unit to the output voltage having a lower frequency than the chopper frequency.

Such a voltage converter provides a high efficiency and a small size, since the voltage transformed by the inductive transformer is chopped at a high frequency. Further, since the chopper means transforms any unipolar voltage to a chopped unipolar voltage, which is transformed by the inductive transformer unit, any waveform, in particular DC and AC voltage can be converted by the voltage converter. Hence, the voltage converter provides AC and DC line operation compatibility with simple technical means.

In a second aspect of the present invention an inductive power coupling for the inductive transfer of electric power is proposed, comprising a first coupling member connectable to a power supply via a set of primary conductors; a second coupling member which is couplable to the first coupling member for inductive power transfer, wherein both the first and second coupling members include a set of inductive coils for the inductive power transfer, a permanent magnet in the respective coupling member for coupling the first coupling member and second coupling member together, a sealing capsule around e the respective coupling member, and wherein the first coupling member further includes an automatic power switch connected to the power supply conductor inside the first coupling member, wherein the power switch is activated to provide power to the first coupling member (12) for inductive power transfer when the first coupling member is coupled to the second coupling member, and is deactivated to remove power from the first coupling member when the second coupling member is not coupled to the first coupling member.

This arrangement provides the advantage that the coils in the first coupling member are not energized unless there is a need for them to be energized. Further, the stray electromagnetic field from the coils is eliminated.

According to a first embodiment of the voltage converter, the input circuitry comprises a rectifier unit for rectifying the input voltage and for providing a unipolar voltage as the voltage to the chopper means. This provides a simple possibility to provide an input circuitry which is compatible to AC and DC.

According to a further embodiment of the voltage converter, the inductive transformer unit comprises a resonant capacitor at a primary side connected to the input circuitry and/or at a secondary side connected to the output circuitry. This provides a simple solution to avoid DC current in the inductive transformer unit.

According to a further embodiment of the voltage converter, the output circuitry comprises a second rectifier unit for converting the chopped AC voltage having a changing polarity to a second unipolar voltage having the waveform of the first unipolar voltage provided by the first rectifier. This provides a simple possibility to transform the chopped AC voltage having the changing polarity to a rectified unipolar voltage having the same waveform as the first unipolar voltage.

According to a further embodiment of the voltage converter, the output circuitry comprises a lowpass filter for converting the chopped AC voltage to a second unipolar voltage having the waveform of the first unipolar voltage provided by the first rectifier. This provides an alternative solution to provide a unipolar voltage having the same waveform as the unipolar voltage provided by the first rectifier.

According to a further embodiment of the voltage converter, the output circuitry comprises an inverter for inverting the second unipolar voltage to an AC output voltage having a changing polarity. Hence, the unipolar voltage can be transformed with low technical effort to an AC output voltage having a changing polarity.

According to a further embodiment, the inverter comprises an H-bridge converter including detection means for detecting a minimum of the second unipolar voltage to reconstruct a waveform of the input voltage. Due to the minimum detection, the H-bridge converter can switch the polarity of the input signal to reconstruct the waveform of the input waveform even if no communication to the input side of the inductive transformer is available.

According to a further embodiment of the voltage converter, the rectifier unit and the chopper means form an input circuitry and wherein the converter comprises an H-bridge transformer connected to the input circuitry to reconstruct the waveform of the input voltage. Hence, the H-bridge switches the polarity of the input signal to reconstruct the waveform of the input voltage precisely with low technical effort.

According to a further embodiment of the voltage converter, an envelope of the chopped AC voltage provided by the inductive transformer unit has the same waveform as the input voltage. This allows to carry the frequency information from the input side to the output side of the inductive transformer unit.

According to a further aspect of the voltage converter, the inductive transformer unit comprises an inductive input element inductively coupled to an inductive output element, wherein the inductive elements have different winding ratios to provide a step-up or a step-down converter.

According to a further embodiment of the present invention, the inductive transformer unit is formed by the inductive power coupling according to the second aspect of the present invention.

In an embodiment of the inductive power coupling, the automatic power switch may be a Hall effect switch that is responsive to the presence of the second coupling member, in particular to the presence of the permanent magnet in the second coupling member. A Hall effect switch is small and reliable and permits the high voltage power to the first coupling member to be turned off, which saves power, reduces the chance of electric shock and eliminates stray electromagnetic fields.

In an embodiment of the inductive power coupling, the sealing capsules for the first and second coupling members may be watertight, oil-resistant and/or corrosion-resistant. Thus, the couplings may be used in virtually any environment.

In a further embodiment of the inductive power coupling, the first and second coupling members may include co-acting mechanical coupling mechanisms to bolster the attachment between the first and second coupling members. Thus, the magnets do not need to be excessively strong, and no special manipulations of the first and second coupling members are required to separate them.

In a subsequent embodiment of the inductive power coupling, the first and second coupling members may each include an electromagnetic field shield around the coils and inside the sealing capsules. The electromagnetic field shield reduces the leakage of high frequency electromagnetic fields to the surrounding environment.

In another embodiment of the inductive power coupling, the first coupling member includes a first signal shaping circuit for converting a nominal power level into a higher frequency power for inductive transfer to the second coupling member 14, and the second coupling member includes a second signal shaping circuit for converting the inductively-received higher frequency power into the nominal power level. This arrangement provides the advantage of a more-efficient inductive power transfer than is possible at the nominal power level.

In a further embodiment of the inductive power coupling, the first coupling member may further include a line current measurement means in communication with the power switch, and a timing means in communication with the power switch, wherein when the automatic power switch detects that the second coupling member is coupled to the first coupling member, the-line voltage applied to the coils of the first coupling member is stopped for a predetermined time interval if a line current exceeds a predetermined limit. The line voltage is applied initially, but is closely monitored for conditions exceeding design parameters. This arrangement provides for the possibility that the automatic power switch may be fooled, such as by a stray external magnetic field, into sensing that the second coupling member is coupled to the first coupling member, or if the load connected to the second coupling member exceeds the load rating.

In an additional embodiment of the inductive power coupling, the line voltage is applied again at the end of a predetermined waiting period. This provides for the possibility that the second coupling member may be coupled to the first coupling member in the waiting period. The waiting period may be used to check for the status of the coupling, e.g. if it is coupled or not, on a regular basis, and not to filter out erratic, e.g. transient shutdowns. Line voltage may be applied again, subject to the previously described predetermined limit on the line current and the predetermined time limit.

In another embodiment of the inductive power coupling, the automatic power switch may be in further communication with a second power switch at the power supply at a source via a low-voltage or ground conductor wherein a second automatic power switch is arranged to remove power from the set of primary conductors when the second coupling member is not coupled to the first coupling member or when the second switch is not in communication with the first switch. This renders the entire first coupling member electrically inactive and quite safe to handle, even if the insulation on the conductors is damaged, or if the conductors are severed. As only low-voltage would remain in the conductors, the risk of electric shock is greatly reduced.

In a further embodiment of the inductive power coupling, both the first and second coupling members may each include a pot core in the inductive coils. A core may enhance the coupling effect between the coils, which may improve the efficiency of the inductive power transmission.

These and other aspects of the invention will be apparent from and further explained with reference to the embodiments described hereinafter.

DETAILED DESCRIPTION OF THE INVENTION

Figure 1:
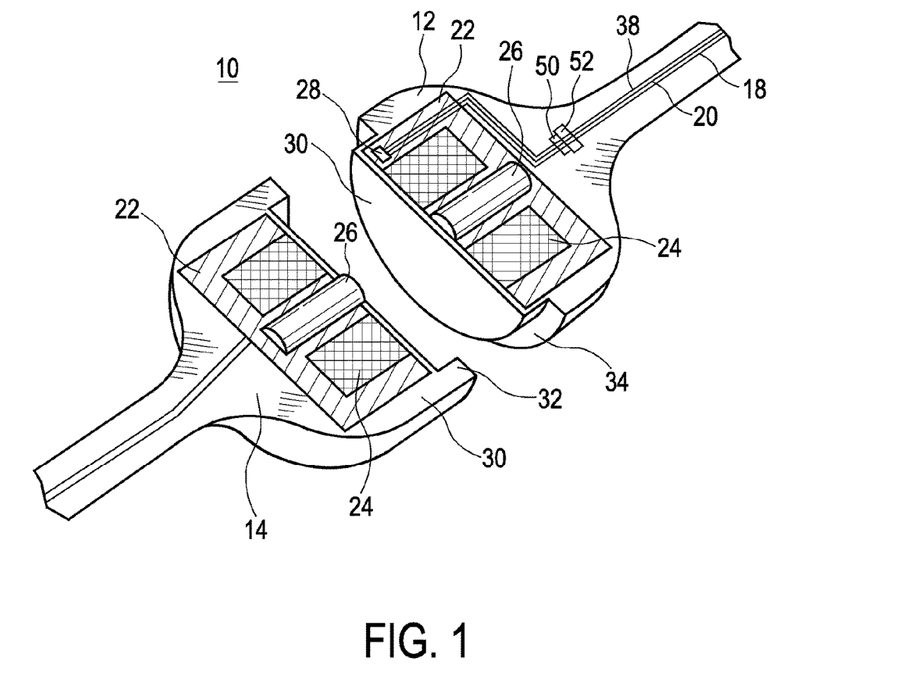
FIG. 1 illustrates a sectional perspective view of an inductive power coupling assembly, in accordance with an embodiment of the invention.

FIG. 1 illustrates a sectional perspective view of an inductive power coupling 10 comprising a first coupling member 12 which is connectable to a power supply 16 via a set of primary conductors 18, 20. A second coupling member 14 is couplable to the first coupling member 12 for inductive power transfer. Both the first and second coupling members 12, 14 include a set of conductive coils 24, and a permanent magnet 26. The magnets 26 are for drawing the first and second coupling members 12, 14 together magnetically, i.e. for coupling the first and second coupling members 12, 14.

Figure 2:
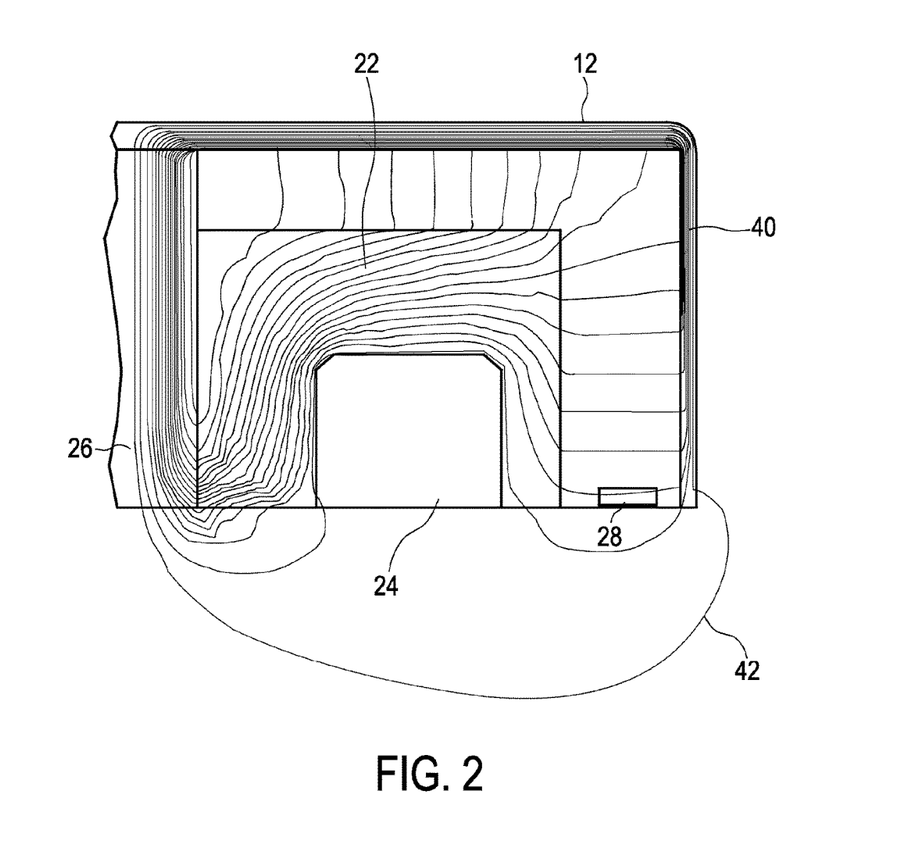
FIG. 2 illustrates a sectional view of the arrangement of the magnetic field with respect to the automatic power switch in the first coupling member when no second coupling member is in proximity, according to an embodiment of the invention.
Figure 3:
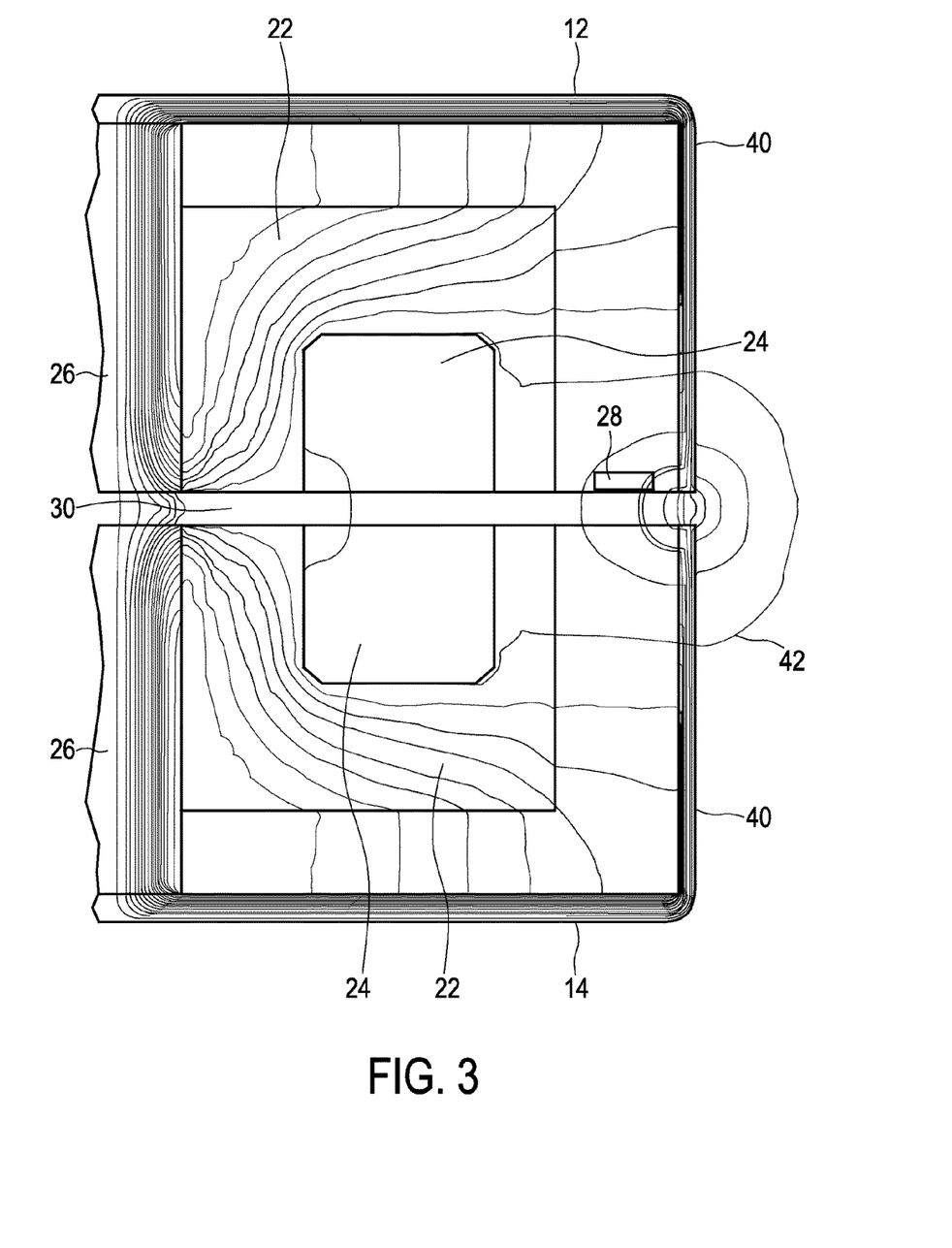
FIG. 3 illustrates a sectional view of a magnetic field around the automatic power switch in the first coupling member when the second coupling member is in the coupled position, according to an embodiment of the invention.

Both the first coupling member 12 and the second coupling member 14 include a sealing member 30 which envelopes each of the coupling members 12, 14 separately. An automatic power switch 28 is connected to the primary conductors 18, 20 from the power supply 16 inside the first coupling member 12. The power switch 28 is actuated when the second coupling member 14 is coupled to the first coupling member 12. The power switch 28 is deactivated to remove power from the coils 24 of the first coupling member when the second coupling member is not coupled to the first coupling member. FIG. 2 and FIG. 3 illustrate this arrangement. Activation of the switch 28 only when the first and second coupling members 12, 14 are coupled reduces the likelihood of shock and eliminates the electromagnetic field from the coil 24 in the first coupling member 12.

The sealing member 30 may also provide numerous protective capabilities including watertight properties, oil resistance and corrosion resistance. Thus, the inductive power coupling may be used in virtually any environment. The sealing members 30 may be formed differently on the first and second coupling members 12, 14 to form complementary, mechanical coupling mechanisms 32, 34, in order to promote a desired mechanical coupling or physical arrangement of the first coupling member 12 with respect to the second coupling member 14.

The mechanical coupling mechanisms 32, 34 may be used to reduce the required strength of the magnets 26. As shown in FIG. 1, the co-acting mechanical coupling mechanisms 32, 34 are arranged to promote the alignment of the first coupling member 12 with the second coupling member 14. Other arrangements are possible depending on the application. The first and second coupling members 12, 14 may each include a pot core 22 in the inductive coils 24. The cores 22 may enhance the coupling effect between the coils 24, which may improve the efficiency of the inductive power transmission. The first coupling member 12 and the second coupling member 14 may have a shield part (not shown) for shielding the electromagnetic filed as described below.

The first coupling member 12 may further include a line current measurement unit 50 in communication with the power switch 28, and a timing unit 52 in communication with the power switch 28, wherein when the automatic power switch 28 detects that the second coupling member 14 is coupled to the first coupling member 12, the line voltage applied to the coils 24 of the first coupling member 12 is stopped for a predetermined time interval, e.g. cooling time, if a line current exceeds a predetermined limit. The system then waits for the predetermined time interval and then applies the voltage again. If the predetermined current level is exceeded again, current/voltage application is stopped again, and so on. The current level is exceeded in two conditions:

1) the second coupling member 14 is not coupled to the first coupling member 12. This condition may occur when the pot core 22 is used. When the second coupling member 14 is not coupled to the first coupling member 12, inductance of the primary coil 24 is reduced, so that current may increase rapidly and exceed the predetermined limit; and 2) Overload in the output. When the load, e.g. powered device, connected to the second coupling member 14 draws a power level that is greater than the rated load, the current in the coil 24 in the first coupling member 12 may reach higher than rated values.

There is a predetermined maximum current level, but there does not need to be a predetermined minimum current level. The load in the secondary side may be quite low, e.g. 0.001 Watts, which would make only a small current rise in the first coupling member 12. Even at that reduced power/current level, the full voltage should be available in the second coupling member 14 for that small load.

Thus, this secondary protection system is based on current level in the primary coil 24 to protect the system from over-current conditions and also helps the automatic power switch 28, e.g. Hall-effect sensor, in sensing the coupling situation between the first and second coupling members 12, 14. This arrangement provides for the possibility that the automatic power switch 28 may be fooled, such as by a stray external magnetic field, into sensing that the second coupling member 14 is coupled to the first coupling member 12.

In an additional embodiment, the line voltage is applied again at the end of a predetermined waiting period. This provides for the possibility that the second coupling member may be coupled to the first coupling member in the waiting period. Line voltage may be applied again, subject to the previously described predetermined limit on the line current and the predetermined time limit.

FIG. 2 illustrates the magnetic field 42 around the automatic power switch 28 when the second coupling member 14 is not close enough to activate the power switch 28. In one embodiment, the power switch 28 may be a Hall effect sensor which is sensitive to magnetic fields 42. As the first and second coupling members 12, 14 each include a permanent magnet 26, a magnetic field 42 exists around both the first coupling member 12 and the second coupling member 14 at all times. However, when the two coupling members 12, 14 are brought into proximity, illustrated in FIG. 3, the magnetic fields 42 are altered in a manner which is detectable by the power switch 28. When the first and second coupling members 12, 14 are sufficiently far apart a horizontal magnetic field, with respect to the arrangement of the power switch 28, is present in the first coupling member 12, as shown in FIG. 2. In this condition, the power switch 28 disconnects the power through the primary conductors 18, 20 and thereby eliminates the potential emanation of any kind of electromagnetic field from the coil 24 of the first coupling member 12. However, as shown in FIG. 3, when the second coupling member 14 is brought into proximity with the first coupling member 12 the magnetic field 42 in the vicinity of the automatic power switch 28 is arranged substantially vertically through the power switch 28.

The change in the magnetic field 42 with respect to the power switch 28 causes the power switch 28 to permit the flow of electric power through the primary conductors 18, 20 and the coil 24 of the first coupling member 12. In the presence of the second coupling member 14, the flow of power through the coil 24 of the first coupling member 12 results in the inductive transfer of power into the coil 24 of the second coupling member 14. This results in usable power from the coil 24 of the second coupling member 14 via a separate set of conductors 44, 46 (see FIGS. 4 and 5) without any direct metal-to-metal contact or exposed electric contacts.

Figure 4A:
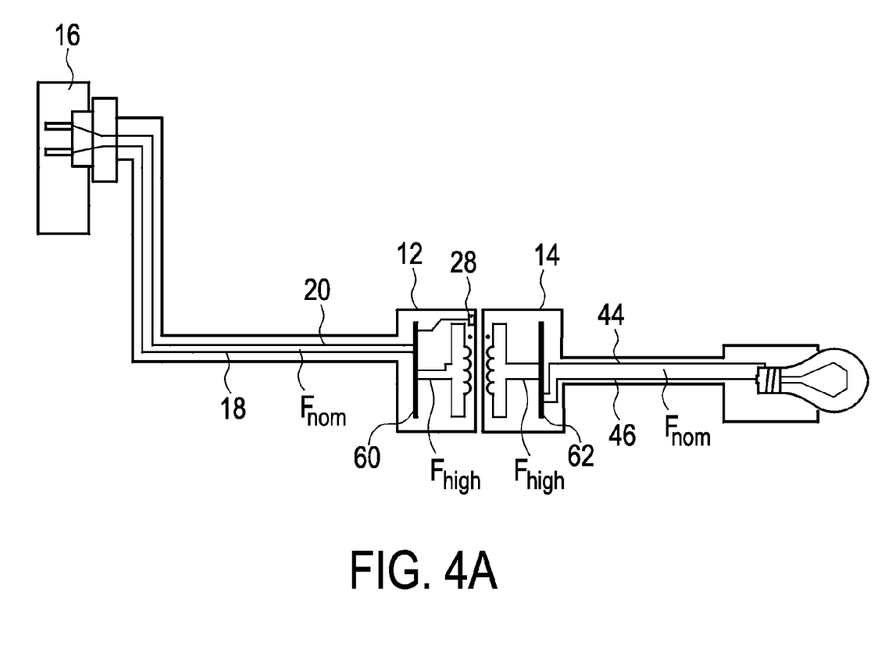
FIGS. 4A and 4B illustrate schematic views of a signal shaping circuit for an inductive power coupling, in accordance with an embodiment of the invention.
Figure 4B:
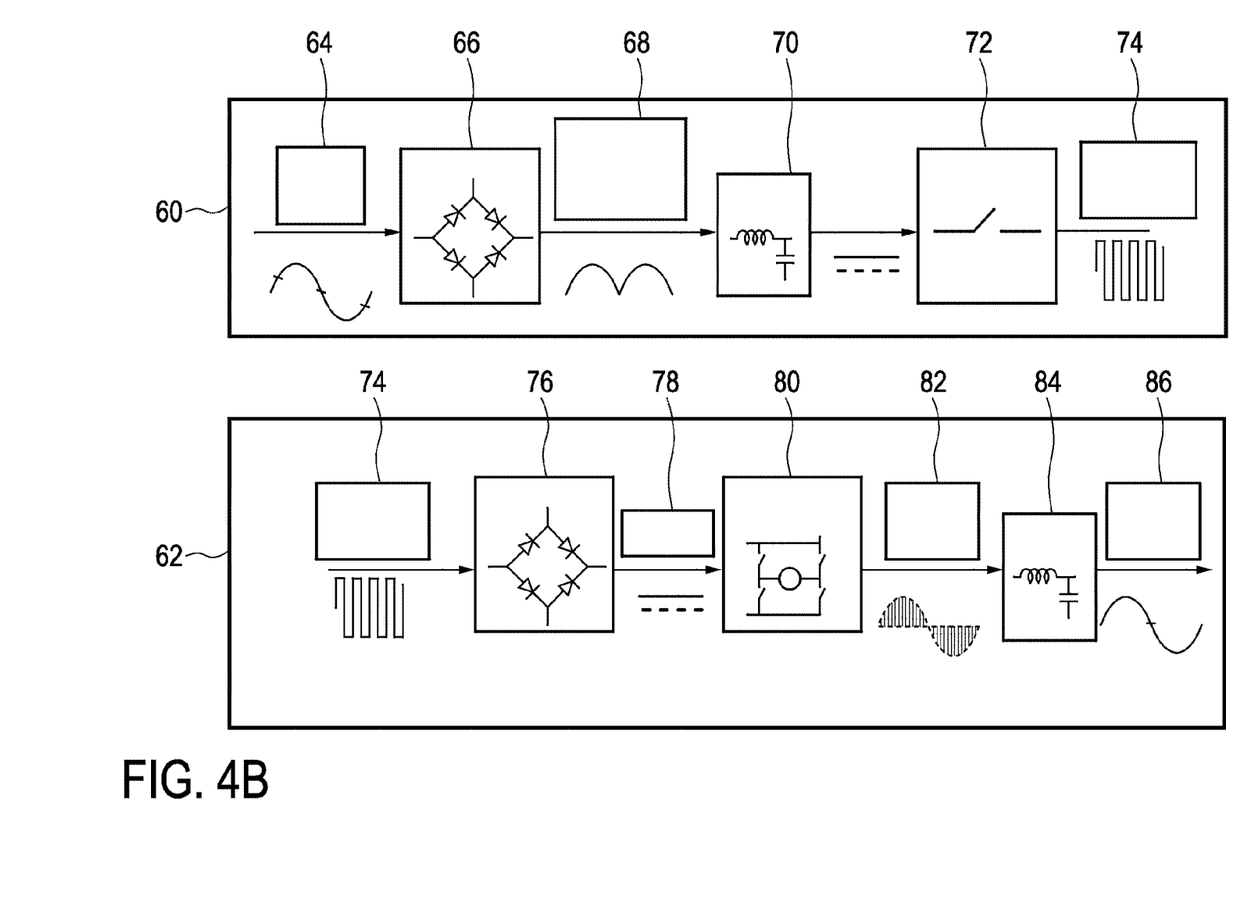

FIGS. 4A and 4B illustrate an embodiment of the invention wherein a first signal shaping circuit 60 is incorporated into the first coupling member 12 for converting the nominal electric power $F_{nom}$ in conductors 18, 20 into a higher frequency AC signal $F_{high}$ for more efficient transfer to a second signal shaping circuit 62 which is incorporated into the second coupling member 14. For example, the nominal power $F_{nom}$ in the conductors 18, 20 may be 230V 50 Hz alternating current (AC). After being processed through the first signal shaping circuit 60, the higher frequency power $F_{high}$ in the coils 24 of the first coupling member 12 may be 100 kHz. The higher frequency signal is capable of more efficient inductive power transfer to the second signal shaping circuit 62 than the nominal power $F_{nom}$. Upon receipt in the second signal shaping circuit 62, the higher frequency power $F_{high}$ is converted to a lower frequency level, e.g. $F_{nom}$ for transmission through conductors 44, 46.

FIG. 4B illustrates an example embodiment for the signal shaping circuits 60, 62. Power 64 from conductors 18, 20, e.g. 50 Hz AC, is received at a rectifier 66 where it becomes 50 Hz rectified AC power 68. Next, the rectified power 68 is processed through a filter 70 and a chopper 72 to transform the power into a higher frequency, e.g. 100 kHz AC power 74 for inductive transmission. At the second coupling member 14, the higher frequency power 74 is inductively received and processed through a rectifier 76 into DC power 78. Next, the DC power 78 is processed through an inverter 80, and the resulting noisy AC signal 82 is processed through a filter 84 to provide clean AC power 86, e.g. 50 Hz AC.

The signal shapers 60, 62 may be composed of two sealed boxes contained within the first and second coupling members 12 and 14, as illustrated in FIG. 4A. The first coupling member 12 includes a first signal shaping circuit 60 which converts the nominal 230V 50 Hz AC from the main power lines 18, 20 into a higher frequency AC signal to inductively transfer more power in a confined space. The first signal shaper circuit 60 receives data from first power switch 28, e.g. Hall-effect sensor, and gets line current measurements from the primary coil 24.

The second coupling member 14 includes a second signal shaping circuit 62 which may convert the higher frequency AC signal to standard 230V 50 Hz power, or whatever power is required. Except for the first and second coupling members 12, 14, the remaining components may be standard 230V, or other specification, cables and connectors. The load, e.g. powered device, is connected to the second coupling member 14 via a standard female plug, e.g. 230V, and the first coupling member 12 may receive its power via a standard male plug, e.g. 230V.

Figure 5:
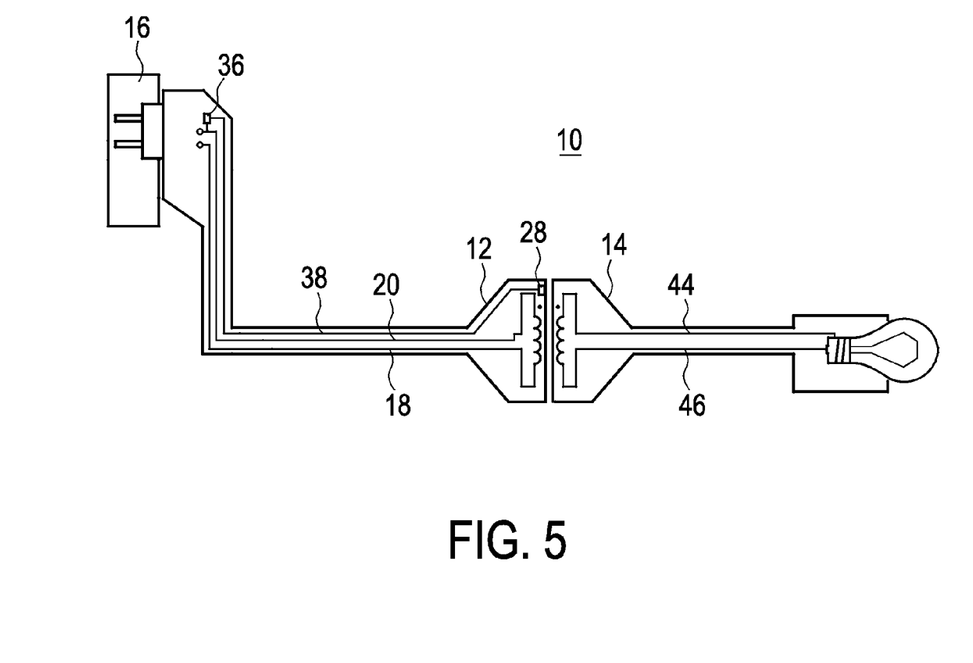
FIG. 5 illustrates a schematic diagram of an inductive power coupling system having a second power switch in communication with the power supply, according to an embodiment of the invention.

FIG. 5 illustrates an embodiment of the invention where a second automatic power switch 36 which is located along the primary conductors 18, 20 near the power source 16 is in communication with the first automatic power switch 28, which is in the first coupling member 12. When the second coupling member 14 is not in proximity to enable power through the coil 24 of the first coupling member 12 the automatic switch 28 communicates this condition to the second power switch 36. The second power switch 36 opens the circuit in the primary conductors 18, 20 and prevents any power from flowing through the primary conductors 18, 20.

This arrangement means that if the second coupling member 14 is not in proximity with, or coupled to, the first coupling member 12 then no power, or only an insignificant amount of power, is available at the first coupling member 12 through the primary conductors 18, 20. The second power switch 36 may be in communication with the first power switch 28 via a number of paths, e.g. a dedicated low voltage power line run along with the primary conductors 18, 20, one of the primary conductors 18, 20, or a separate wire, e.g. a ground wire or low-voltage wire 38 may be used for this communication. The second power switch 36 may be arranged to disable each of the primary conductors 18, 20 or may simply disable the hot conductor 20 without affecting the neutral conductor 18. Thus, even if the sealing member 30 of the first coupling member 12 is compromised, absolutely no risk of a short circuit or electrocution exists if the first switch 28 indicates that the second coupling member 14 is not in proximity.

Figure 6:
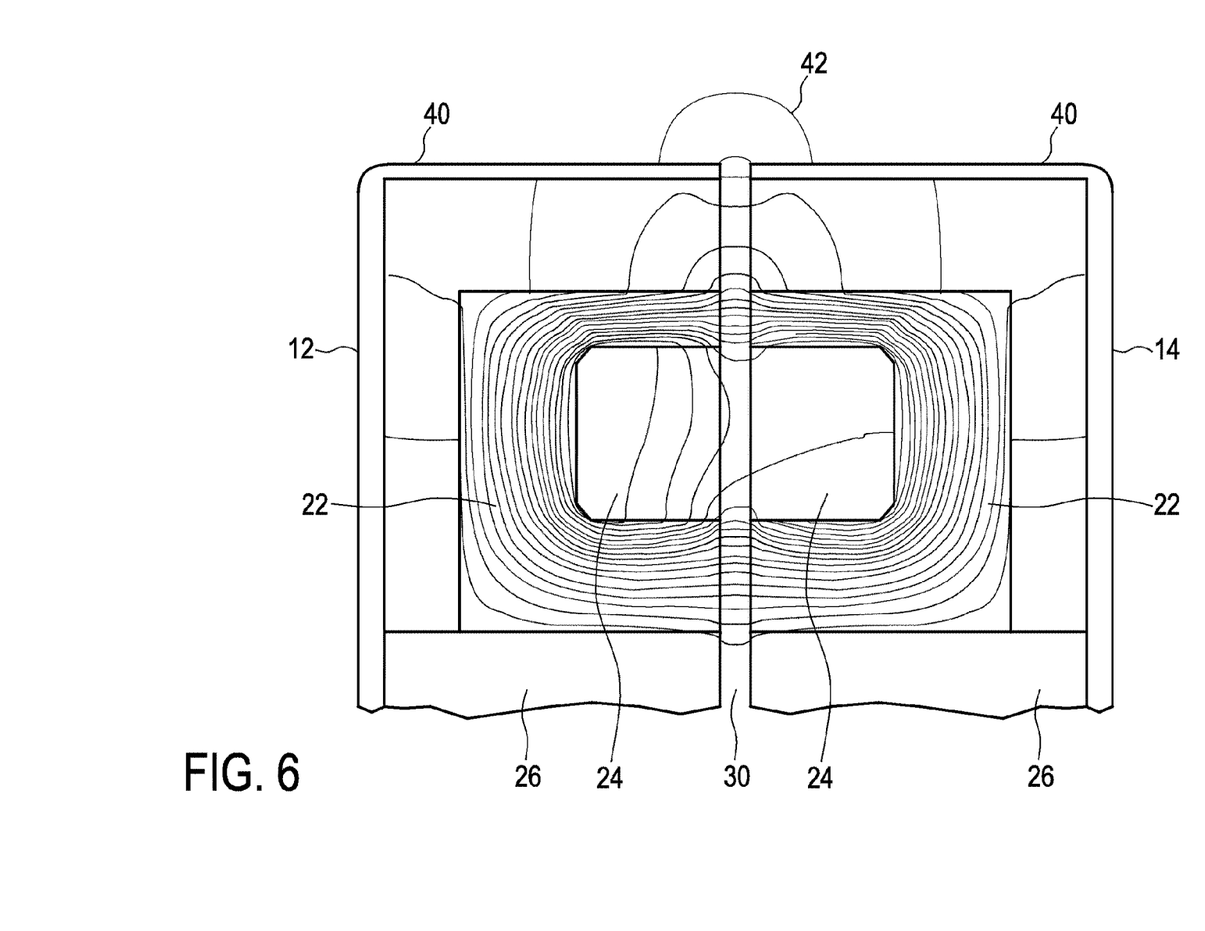
FIG. 6 illustrates the shielding effect of the electromagnetic field shield for the inductive power coupling device, in accordance with an embodiment of the invention.

FIG. 6 illustrates the arrangement of an electromagnetic field shield 40 around the coil 24 and optional core 22 without a power switch 28. The electromagnetic field shield 40 may be an iron housing around the coil 24 and optional core 22 which directs the magnetic field 42 associated with the first and second coupling members 12, 14 immediately around the coupling members 12, 14. This arrangement reduces the undesired effects of a stray magnetic field in the proximity of sensitive electronics.

The electromagnetic shield 40 is not only provided for shielding electromagnetic the field but it is also provided for directing the magnetic flux of the permanent magnet 26 so that it does not saturate the core 22. When the system is built as shown in FIG. 1, without the electromagnetic shield 40 and the magnet 26 is incorporated in the core 22, the core 22 saturates due to the permanent magnet flux and becomes ineffective. The topology shown in FIG. 6, allows to separate most of the magnetic flux of the permanent magnet 26 from the fluctuating electromagnetic flux.

Figure 7:
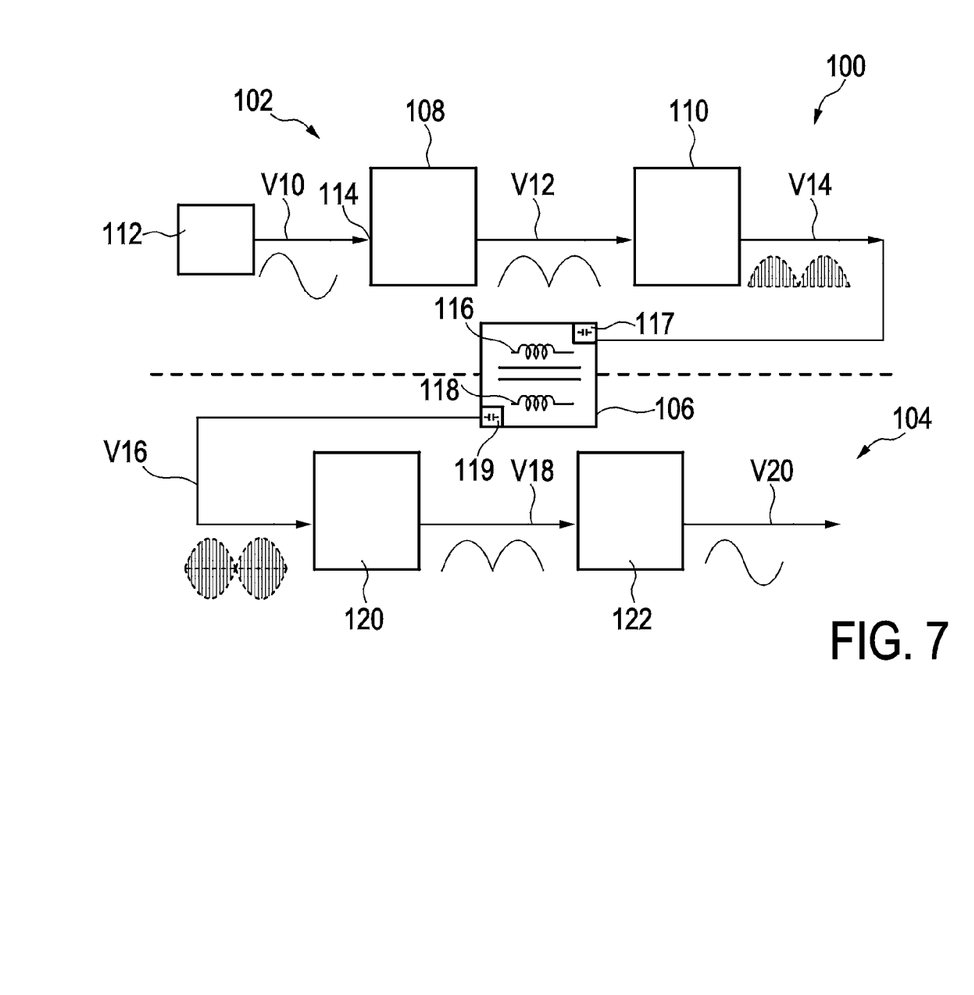
FIG. 7 shows a schematic diagram of a voltage converter according to one aspect of the present invention.

FIG. 7 illustrates a voltage converter generally denoted by 100. The voltage converter 100 is formed of a primary side circuitry 102 and a secondary side circuitry 104 which are connected to each other by an inductive transformer unit 106.

The primary side circuitry 102 comprises a rectifier unit 108 connected to a chopper 110, which is connected to the inductive transformer unit 106. A power supply unit 112 provides an input voltage V10 to an input 114 of the rectifier 108. The rectifier 108 rectifies the voltage V10 to a unipolar voltage V12. The chopper 110 is directly connected to the rectifier 108. Hence, the unipolar voltage V12 is provided from the rectifier 108 to the chopper 110. The unipolar voltage V12 provided by the rectifier 108 is not rectified to a DC voltage, e.g. by a capacitor or by a filter. The unipolar voltage V12 is directly chopped by the chopper 110 at a high frequency in a kHz range. The chopper 110 provides a chopped unipolar voltage V14 to the inductive transformer unit 106. A chopper frequency of the chopper 110 is preferably in a kHz range, e.g. 100 kHz.

The input voltage V10 may be an AC voltage of different frequencies or may be a DC voltage. Since the chopper 110 chops the unipolar voltage V12 to the chopped unipolar voltage V14, which is provided to the inductive transformer unit 106 and transformed to the secondary side circuitry 104, any voltage can be transformed from the primary side circuitry 102 to the secondary side circuitry 104. In other words, an AC voltage having a changing polarity will be rectified to a unipolar voltage V12 and a DC voltage as input voltage V10 will remain a DC voltage and can also be chopped by the chopper 110 and transformed by the inductive transformer unit 106. Hence, the voltage converter 100 is compatible to DC, AC and varying frequency systems. The chopper 110 is in this embodiment is preferably formed by a full bridge chopper.

The inductive transformer unit 106 comprises a primary inductive element 116 formed of a primary winding and a secondary inductive element 118 formed of a secondary winding. The primary inductive element 116 is inductively coupled to the secondary inductive element 118 and forms a transformer. The winding ratio of the primary winding and the secondary winding determines a ratio of the input voltage to the output voltage of the voltage converter 100 may be variable or adjustable to set the output voltage (V20) to different values. Hence, the voltage converter 100 can form a step-up or step-down converter. Preferably, a resonant capacitor 117 is connected to the primary inductive element 116 and/or a resonant capacitor 119 is connected to the secondary inductive element 118. The resonant capacitor 117 is provided to avoid DC current in the primary and/or secondary inductive element 118.

The unipolar chopped voltage V14 is transformed to an AC chopped voltage by means of the inductive transformer unit 106 due to the nature of the inductive transformer unit 106. The chopped AC voltage V16 has a changing polarity and has the same chopper frequency as the chopped unipolar voltage V14.

The chopped AC voltage V16 is provided to the secondary side circuitry 104. The secondary side circuitry 104 comprises a rectifier unit 120 for receiving the chopped AC voltage V16 and for rectifying the chopped AC voltage V16 to a unipolar voltage V18. The unipolar voltage V18 has the same waveform as the unipolar voltage V12 provided by the rectifier 108. If the unipolar voltage V12 is a pulsating unipolar voltage having e.g. a sectionally sinusoidal shape, the unipolar voltage V18 will have the same waveform. If the rectified unipolar voltage V12 is a constant direct voltage, the unipolar voltage V18 will have the same shape. As mentioned above, the difference of voltage V12 and voltage V18 is the value due to the ratio of the winding of the inductive transformer unit 106. According to an alternative embodiment, the chopped AC voltage V16 is filtered by a lowpass filter to form the unipolar voltage V18.

The unipolar voltage V18 is inverted by an inverter 122 to an AC voltage V20. The AC voltage V20 is the output voltage V20 of the secondary side circuitry 104 and also the output voltage of the voltage converter 100. The inverter 122 actively switches the unipolar voltage V18 to the AC output voltage V20 having a changing polarity to reconstruct the waveform of the input voltage V10. The inverter 122 is preferably formed of an H-bridge 122 having a minimum detection or a zero crossing detection. The H-bridge 122 detects the minimum point of the unipolar voltage V18 and switches actively to provide a changing polarity of the output voltage V20 and to reconstruct the waveform of the input voltage. Hence, the waveform of the output voltage V20 is identical with the waveform of the input voltage V10.

If a communication between the primary side circuitry 102 and the secondary side circuitry 104 is available, the inverter 122 gets a real-time signal information from the primary side circuitry 102 and triggers the polarity change of the inverter 122 accordingly. If no communication between the primary side circuitry 102 and the secondary side circuitry 104 is available, the inverter 122 or the H-bridge 122 detects the minimum point and triggers the polarity change at that moment. If the frequency of the input voltage V10 is known, the inverter 122 can use this information to increase the accuracy of the switching. Hence, the waveform of the input voltage V10 can be reconstructed.

Figure 8:
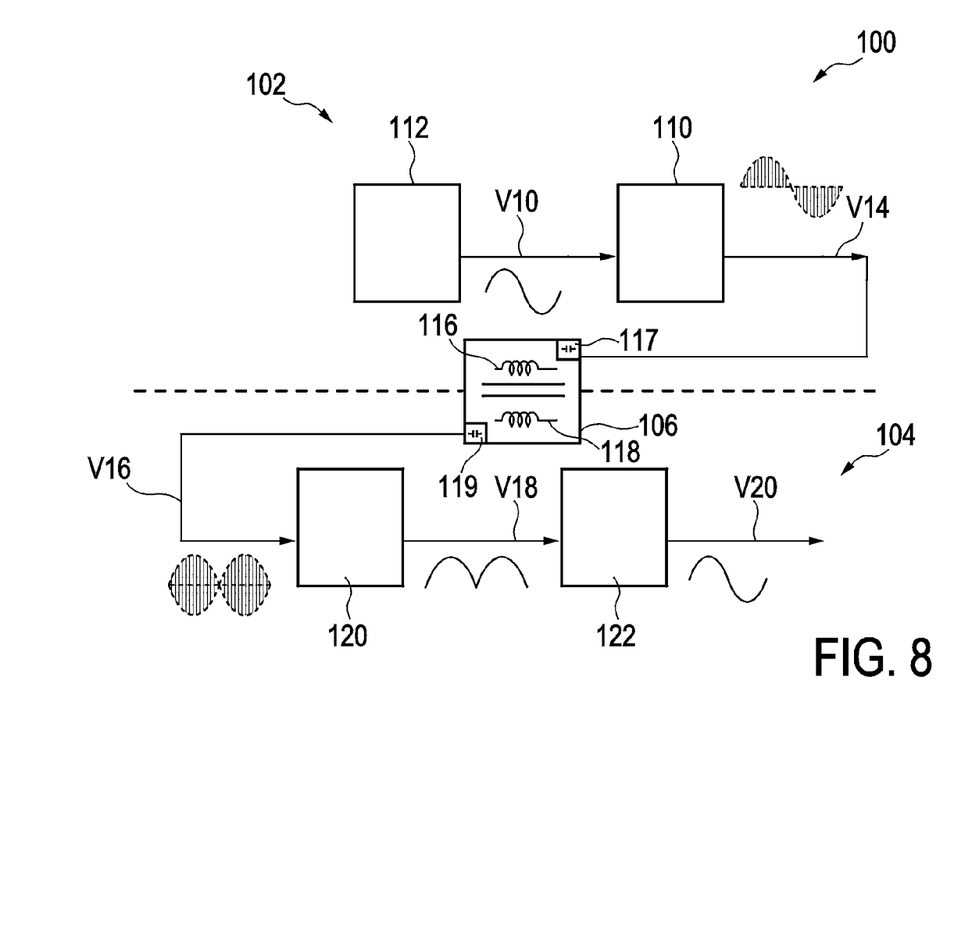
FIG. 8 shows a schematic diagram of an alternative embodiment of the voltage converter according to the present invention.

FIG. 8 shows an alternative embodiment of the voltage converter 100 of FIG. 7. Identical elements are denoted by identical reference signs, wherein here only the differences are described in detail. The chopper 110 is directly connected to the power supply unit 112 and receives the input voltage V10. The chopper 110 chops the AC input voltage V10 having a changing polarity to a chopped AC voltage V14 having a changing polarity. The envelope of the chopped AC voltage V14 is identical with the wave form of the input voltage V10. The transformer unit 106, optionally including one or two of the resonant capacitors 117, 119, transforms the chopped AC voltage V14 to the chopped AC voltage V16, which is provided to the secondary side circuitry 104. The chopper 110 in this embodiment is preferably formed by a full-bridge chopper 110.

Figure 9:
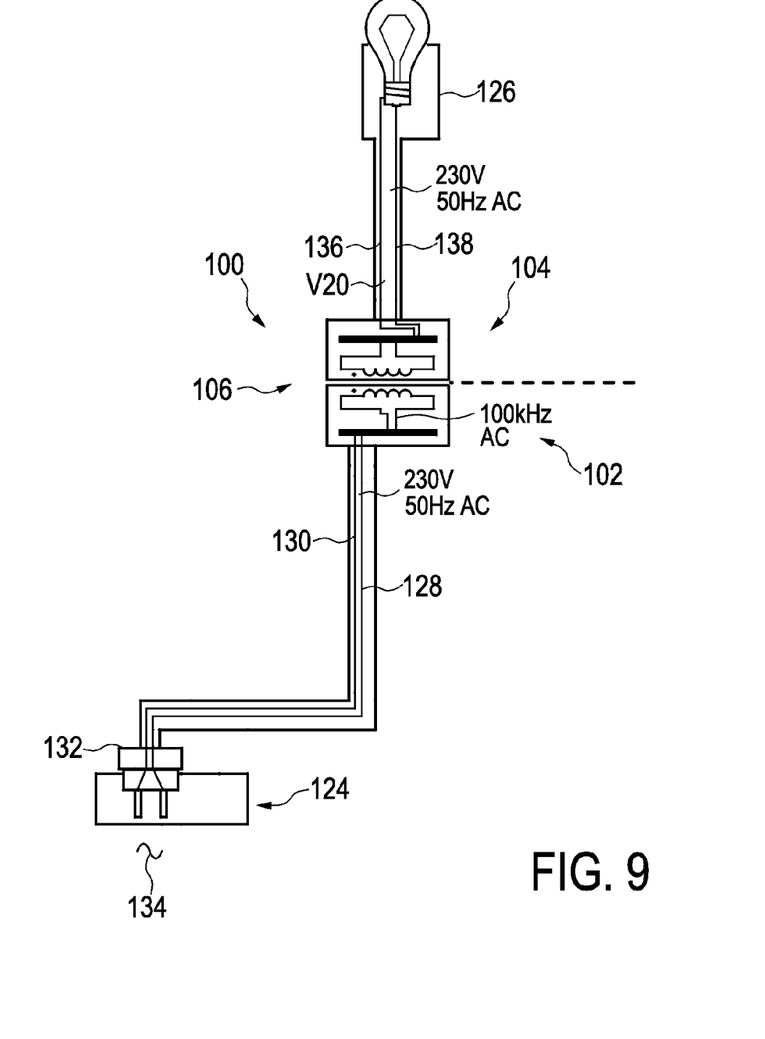
FIG. 9 shows a light assembly connected to a power supply by means of the voltage converter of FIG. 7.

FIG. 9 shows the voltage converter 100 connected to a power grid 124 to power a light assembly 126. The voltage converter 100 is identical with the voltage converter 100 shown in FIG. 7 or 8. The primary side 102 is connected via input lines 128, 130 to a plug 132. The plug 132 is connected to the power grid 124 such as a public power grid providing a mains voltage 134. The mains voltage 134 is a 50 Hz AC voltage of 230 Volt provided to the primary side circuitry 102. The output voltage V20 of the secondary side circuitry 104 is an AC voltage of the same frequency and the same value of 230 Volt. The secondary side circuitry 104 is connected to the light assembly 126 via two output lines 136, 138.

The value of the output voltage V20 is dependent on the winding ratio of the inductive transformer elements 116, 118. Hence, any voltage value can be provided as an output voltage V20 to power the light assembly 126.

The inductive power coupler of FIGS. 1-3 can be used for the voltage converter 100 to connect the primary side circuitry 102 and the secondary side circuitry 104. In that case, the inductive power coupling forms the inductive transformer unit 106.

In general, the voltage converter can be utilized in power transmission grids as step-down or step-up transformer. The voltage converter provides a small and light system due to the chopper frequency transformed by the inductive transformer unit 106. Hence, the system saves raw materials, e.g. copper or steel.

Further, the voltage converter 100 can be used for DC grid line or AC grid line having higher or lower frequencies than 50/60 Hz, since the voltage converter is compatible to AC and DC voltage.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A voltage converter for converting an input voltage to an output voltage, said voltage converter comprising:
   a primary element comprising:
      an input circuitry configured to receive the input voltage from a power supply, the input circuitry comprising:
         a chopper configured to generated a chopped voltage from a voltage derived from the input voltage, the chopped voltage being at a chopper frequency,
      an inductive transformer unit configured to transform the chopped voltage to a chopped AC voltage,
      a first magnet configured to generate a magnetic field;
      a switch configured to monitor a direction of the magnetic field; and
   a second element, attachable to the primary element, the second element comprising:
      a second magnet configured to generate a second magnetic field, said second magnet oppositely opposed to the first magnet; and
      an output circuitry configured to convert the chopped AC voltage of the inductive transformer unit to the output voltage, said output voltage having a frequency lower than the chopper frequency, wherein the switch is configured to:
         determine the output circuitry is proximate to the input circuitry by determining an alteration of the direction of the magnetic field, wherein said alteration of said direction of the magnetic field causing the first magnetic field to pass substantially vertically through the switch; and
         remove said input voltage from said input circuitry when the output circuitry is determined not proximate to the input circuitry.

2. The voltage converter of claim 1, wherein the input circuitry comprises:
   a rectifier unit configured to:
      rectify the input voltage; and
      provide a unipolar voltage as the voltage derived from the input voltage.

3. The voltage converter of claim 1, wherein the inductive transformer unit comprises:
   a resonant capacitor connected to one of: a primary side to the input circuitry and a secondary side to the output circuitry.

4. The voltage converter of claim 1, wherein the output circuitry comprises:
   a second rectifier unit configured to convert the chopped AC voltage to a second unipolar voltage having a waveform of the unipolar voltage provided by the first rectifier.

5. The voltage converter of claim 1, wherein the output circuitry comprises:
   a lowpass filter configured to convert the chopped AC voltage to the second unipolar voltage.

6. The voltage converter of claim 1, wherein the output circuitry comprises:
   an inverter configured to invert the second unipolar voltage to an AC output voltage.

7. The voltage converter of claim 6, wherein the inverter comprises:
   an H-bridge comprising:
      a detector configured to detect:
         a minimum of the second unipolar voltage to reconstruct the waveform of the input voltage.

8. The voltage converter of claim 6, wherein the inverter comprises an H-bridge connected to the input circuitry to reconstruct the waveform of the input voltage.

9. An inductive power coupling comprising:
   a first coupling member connected to a power supply via a set of primary conductors, the first coupling member comprising:
      a first signal shaping circuit configured to convert a nominal AC power level ($F_{nom}$) into a higher frequency power ($F_{high}$); and
      an automatic power switch connected to the set of primary conductors, said power switch configured to determine a direction of a magnetic field; and
   a second coupling member configured to couple to the first coupling member to inductively receive the higher frequency power transferred from the first coupling member, the second coupling member comprising:
      a second signal shaping circuit configured to convert the inductively-received higher frequency power ($F_{high}$) into the nominal AC power level ($F_{nom}$), wherein each of the first and second coupling members comprises:
   a set of inductive coils configured to inductively transfer power,
   a permanent magnet configured to couple the first coupling member and the second coupling member together,
   a sealing capsule positioned around the respective coupling member; wherein the power switch is activated to provide power to the first coupling member when the direction of a magnetic field generated by the permanent magnet passes vertically through the power switch.

10. The inductive power coupling of claim 9, wherein the automatic power switch comprises:
    a Hall Effect switch responsive to the presence of the second coupling member.

11. The inductive power coupling of claim 9, wherein the first and second coupling members comprise:
    an electromagnetic field shield around the coils and inside the sealing capsule to reduce the leakage of high frequency electromagnetic fields.

12. The inductive power coupling of claim 9, wherein the first coupling member further comprises:
    a line current measurement means in communication with the power switch; and
    a timer, in communication with the power switch, configured to initiate a predetermined time interval, wherein a line voltage applied to the coils of the first coupling member is stopped for the predetermined time interval when a line current exceeds a predetermined limit.

13. The inductive power coupling of claim 9, wherein the power switch is in further communication with a second power switch to control power through the set of primary conductors, wherein the second power switch is located away from the first coupling member and near the power supply.

14. The inductive power coupling of claim 13, wherein the second switch is configured to:
    remove electric power from the primary conductors when at least one of: the second coupling member is not coupled to the first coupling member, and not in communication with the power switch.

* * * * *